United States Patent [19]
Thompson

[11] 3,763,043
[45] Oct. 2, 1973

[54] CHALCOGENIDES INTERCALATED WITH A MIXTURE OF AN ORGANIC NITROGEN COMPOUND AND SULFUR

[75] Inventor: Arthur H. Thompson, New Province, N.J.

[73] Assignee: Syva Company, Palo Alto, Calif.

[22] Filed: Jan. 31, 1972

[21] Appl. No.: 222,315

[52] U.S. Cl.............. 252/31, 250/51.5, 252/25, 252/47, 252/50, 252/518, 252/378, 252/439, 423/62, 423/561
[51] Int. Cl..... C10m 7/34, C10m 7/32, C10m 7/30
[58] Field of Search............ 252/25, 518, 31, 252/50, 47, 378, 439; 250/51.5; 423/62, 561

[56] References Cited
UNITED STATES PATENTS

| | | | |
|---|---|---|---|
| 3,573,204 | 3/1971 | Van Wyk | 252/25 |
| 3,523,079 | 8/1970 | Boes et al. | 252/25 |
| 3,479,289 | 11/1969 | Van Wyk | 252/25 |

*Primary Examiner*—Daniel E. Wyman
*Assistant Examiner*—I. Vaughn
*Attorney*—Stephen S. Townsend et al.

[57] ABSTRACT

Novel intercalated chalcogenides are prepared having high crystal regularity and enhanced thermal stability by intercalating an intercalatable metal chalcogenide with an organic nitrogen compound in the presence of sulfur. Said intercalated chalcogenides may be used as solid lubricants, superconductive materials, and catalysts.

21 Claims, No Drawings

CHALCOGENIDES INTERCALATED WITH A MIXTURE OF AN ORGANIC NITROGEN COMPOUND AND SULFUR

BACKGROUND OF THE INVENTION

1. Field of the Invention

It is found that many inorganic materials, particularly metal chalcogenides, exist or can be formed in relatively well-ordered crystal structures having a plurality of planes with relatively weak attractive forces between the planes. Therefore, these materials have been found to fracture easily along the planes, the platelets providing solid lubrication for moving systems.

Because of the relatively weak forces between the planes, it has been found possible to introduce molecules between the planes to form products which are stable at ambient temperatures, and do not lose the molecules between the planes until heated to temperatures substantially above ambient. These intercalated products have been shown to have a wide variety of desirable properties.

The intercalated products are usually found to have improved super-conductivity, in that their critical temperatures are higher than the critical temperatures for super-conductivity of the parent metal chalcogenide. Also, the onset of super-conductivity is frequently found to occur at higher temperatures with the intercalated chalcogenides, as compared to the parent metal chalcogenides. In addition, the intercalated chalcogenides are found to have desirable lubricating properties.

2. Description of the Prior Art

Intercalation of chalcogenides is described extensively in copending application, Ser. No. 92,912, filed Nov. 25, 1970. Also, of interest are two articles by Weiss, et al., Z. Naturforschung B. 24, 256, 1066 (1969), and three articles by Gamble, et al. Science, 168, 568 (1970), 174, 493 (1971) and J. Chem. Phys. 55, 3525 (1971).

SUMMARY OF THE INVENTION

An intercalatable metal sulfide is combined with an organic nitrogen-containing compound, and sulfur in amounts sufficient to inhibit loss of sulfur from the metal sulfide for a time and at a temperature sufficient to provide substantially complete intercalation of the metal sulfide. The resulting product is found to be a single crystal structure having a higher thermal stability and a more regular crystal, than is obtained in the absence of sulfur. The de-intercalation of the intercalated chalcogenide obtained in the presence of sulfur results in substantial expansion of the metal sulfide, providing a structure resembling vermiculite.

DESCRIPTION OF THE SPECIFIC EMBODIMENTS

New intercalated chalcogenides having enhanced thermal stability and crystal order are provided by combining under intercalating conditions, an intercalatable metal sulfide, an organic nitrogen compound, and sulfur in an amount to inhibit removal of sulfur from the metal sulfide. The time and temperature of the intercalation is carried out so as to provide substantially complete intercalation of the metal sulfide. The amount of intercalating agent is normally applied in excess of that required to completely intercalate the metal sulfide.

The metal sulfides which are employed are metal sulfides of the IV B and V B metals of the periodic table, except for vanadium. These metals include titanium, zirconium, hafnium, niobium, and tantalum, the preferred metal being tantalum. The metal sulfides may be used individually or in combination as mixtures or mixed crystals, there being from 0.1 to 0.9 mol fraction of one of the metals.

Tantalum disulfide has a number of different polymorphs, the preferred polymorph being the 2H. Niobium disulfide has two polymorphs, the 2H being preferable.

The organic nitrogen compound employed may be varied widely. The organic nitrogen compound will usually be of from one to 30 carbon atoms, more usually of from one to 12 carbon atoms, and have from one to three nitrogen atoms, bonded solely to carbon and hydrogen, more usually one to two nitrogen atoms. Heteroatoms other than nitrogen may be present, including such elements as oxygen, sulfur and silicon. There will normally be present from zero to two heteroatoms other than nitrogen, more usually from zero to one heteratom other than nitrogen.

The nitrogen atoms present in the compounds used in the intercalation may be substantially neutral or basic, and may be present as a wide variety of functionalities. The nitrogen atom may be a primary, secondary, or tertiary amine, may be present as an aliphatic or aromatic amine, as an imine, amidine, amide, nitrile, etc., but is preferably an amine, and particularly preferred a tertiary amine.

The organic nitrogen-containing compound may be aliphatic, alicyclic, aromatic, carbocyclic, or heterocyclic, aliphatically saturated, or unsaturated, preferably free of aliphatic unsaturation. There will normally be from one to two fused or unfused rings when the organic nitrogen compound is cyclic.

When aliphatic unsaturation is present, and high temperatures are required, the tertiary amine will be preferred.

A wide variety of functionalities may be present in the organic nitrogen compound, such as ether, keto, mercapto, thioether, carboxyl, particularly as carboxyl derivatives, e.g., amides, thioamides, amidines, guanidines, iminoesters, esters, lactams, lactones, imides, nitro, etc. Preferred compounds are those which have at least one amine nitrogen.

Illustrative compounds include pyridine, picoline, lutidine, quinoline, pyrrolidine, imidazoline, carbazole, aniline, phenetidine, toluidine, N-ethylaniline, naphthylamine, cyclohexylamine, cyclooctylamine, methylamine, ethylamine, butylamine, decylamine, eicosylamine, didodecylamine, benzamide, acetamide, valeramide, thiobenzamide, N,N'-diphenyl guanidine, toluamidine, N-methylacetophenoneimine, cinnamide, dimethyl-formanide, etc.

A single organic nitrogen compound or mixture of organic nitrogen compounds may be employed, usually with not more than three components.

The sulfur employed may be in any convenient form, but will usually be employed as amorphous sulfur ($S_8$).

The materials are brought together conveniently by mixing, there being no required order of their mixing. Normally, the reaction is carried out in inert atmosphere, conveniently in an evacuated tube or under an inert gas. The pressures employed for the system may vary from ambient to elevated pressures, usually being autogenous.

The temperature may vary widely, normally being at least the temperature at which the organic nitrogen compound intercalates over a reasonable period of time. It is believed that the temperature may be related to reaction between the organic nitrogen compound and sulfur. Changes in color in the organic nitrogen medium are observed which are believed to be a result of reaction of the sulfur and the organic nitrogen compound, during or prior to intercalation.

In some cases, the temperature may be as low as $-10°$ C, more usually being at least 0° C, and not exceeding about 400° C, more usually not exceeding above 300° C. The lowest temperature which provides a reasonable rate of intercalation will be employed. The time for the intercalation will normally be at least about one day, usually not exceeding one year, and more usually for about 1 week to 3 months. It is found that the rate of intercalation is slower in the presence of sulfur, than in the absence of sulfur.

The amount of organic nitrogen compound will be at least about one mol per atom of metal present in the sulfide, and may be present in much greater excess, normally not exceeding about 100 mol excess, and usually being from about 2 to 30 mol excess.

The amount of sulfur that is believed to be actually introduced into the intercalated chalcogenide from the sulfur added to the reaction mixture appears to be extremely minute. However, much larger amounts are required than are actually incorporated in the intercalated metal sulfide. Usually, there will be present at least 10 atoms of sulfur per atom of metal in the metal sulfide, more usually at least about 50, and usually not exceeding about 500, more usually not exceeding about 300.

After combining the materials and bringing the combination to the desired temperature, usually in a sealed tube, in an inert atmosphere, the organic nitrogen compound is noted to change color. Depending on the particular compound employed, the color may vary from yellow to dark black. With time, the appearance of the metal sulfide will change, with evident increase in volume of the metal sulfide. When there appears to be no further expansion in volume of the metal sulfide, the reaction may be stopped, and the metal sulfide isolated.

It is found that the intercalated metal sulfides prepared in the presence of sulfur, particularly with pyridine, that upon heating to the de-intercalation temperature, the intercalate escapes from the crystal extremely rapidly, almost explosively, with great expansion of the crystal. The rate of heating can be varied widely. Once the de-intercalation temperature is reached, rapid loss of the intercalate occurs.

The resulting metal sulfide has a large volume, with layers spread widely apart. These materials can therefore be used as catalysts or for other uses requiring high surface areas, e.g., absorbents.

The following examples are offered by way of illustration, and not by way of limitation.

(All temperatures are in Centigrade, unless otherwise indicated.)

EXAMPLE 1

Into a tube was introduced 100 mg of tantalum disulfide, ½ ml of pyridine, and 1 ml of solid sulfur (amorphous), and the tube evacuated and sealed. The sealed tube was brought to room temperature and heated in a constant temperature bath at about 200° C, for about 30 days. During the course of the reaction, it was noted that the pyridine changed to a relatively dark yellow color. The resulting product had the empirical formula $TaS_2$ — (pyridine)$_{0.5}$.

Crystallographic measurements showed the product to have a c-axis of 12.01 A. By comparison, when sulfur was not present, the resulting product was a mixture of materials, a portion having a c-axis of 12.01 A, and another portion having a c-axis of 11.85 A, as determined by X-ray powder diffraction. The product obtained when employing sulfur, had little or no exfoliation, and did not begin to de-intercalate until 572° K. The de-intercalation occurs extremely rapidly with great expansion of the metal sulfide, so that the resulting product has the appearance of vermiculite. By comparison, the two-phased material obtained in the absence of sulfur, had a first portion begin de-intercalation at 373° K and the remainder at 573° K.

Following the procedure of Example 1, a number of other organic nitrogen materials were intercalated. The following table indicates the conditions of the intercalation, and the physical properties of the product.

| Organic nitrogen compound | TaS$_2$ | S | Temp. °C. | Time days | Mol. of org. N cpd. per Ta | c-axis Å | Deintercalation temp. °K.- | |
|---|---|---|---|---|---|---|---|---|
| | ml. | mg. | ml. | | | | w/o S | w/S |
| II. N,N-dimethylaniline | 0.5 | 100 | 1 | 150 | 14 | 0.14 | 9.1 | 323 | 350 |
| III. Aniline | 0.5 | 100 | 1 | 150 | 30 | 0.65 | 18.32 | 323 | 423 |
| IV. Butylamine | 0.5 | 100 | 1 | 20 | 30 | .14 | 9.8 | 300 | 325 |
| V. Thiobenzamide | 0.5 | 100 | 1 | 150 | 14 | (*) | | | 473 |

\* Intercalation was not carried to completion, but intercalation shown to occur.
† Beginning of de-intercalation. Heating rate 4°–5° C/min.

The materials formed in accordance with this convention are shown to have a highly ordered structure, providing extremely sharp peaks in X-ray diffraction analysis and are therefore useful as gratings for high-energy radiation. In addition, the materials are super-conductive and can be used as super-conductive materials. The materials also are active as solid lubricants.

While several embodiments of the invention have been shown and described, it will be obvious that other adaptations and modifications can be made without departing from the true spirit and scope of the invention.

What is claimed is:

1. A method for intercalating an intercalatable metal sulfide, wherein the metal is a member of Group IV B, or Group V B, other than Vanadium which comprises:
combining said metal sulfide, an organic nitrogen compound, and an effective amount sulfur for a time and at a temperature sufficient to substantially complete the intercalation of said metal sulfide to provide a highly ordered intercalated metal sulfide, wherein there is present one mol of said nitrogen compound per atom of said metal, and said temperature is in the range of $-10°$ to 400°C, and said time is from about one day to one year.

2. A method according to claim 1 wherein said metal sulfide is tantalum disulfide.

3. A method according to claim 1 wherein said organic nitrogen containing compound is of from one to 30 carbon atoms, and of from one to three nitrogen atoms.

4. A method according to claim 3 wherein at least one of the said nitrogen atoms is a primary, secondary, or tertiary amine.

5. A method according to claim 4, wherein said amine is an aliphatic amine.

6. A method according to claim 4, wherein said amine is a heterocyclic amine.

7. A method according to claim 4, wherein said amine is an aromatic amine.

8. A method according to claim 4, wherein said amine is aniline.

9. A method according to claim 4, wherein said amine is pyridine.

10. A method according to claim 4, wherein said amine is butylamine.

11. A method according to claim 3, wherein said organic nitrogen compound is thiobenzamide.

12. A method according to claim 1, wherein the number of mols of said organic nitrogen compound to atoms of metal present in the metal sulfide is in the range of 1 to 100 : 1.

13. A method according to claim 1, wherein the atoms of sulfur to atoms of metal are in the range of 10 to 500 : 1 and sufficient to prevent the loss of sulfur from said metal sulfide.

14. A method for preparing a highly ordered intercalated tantalum disulfide which comprises:
   combining tantalum disulfide, sulfur, and an amine of from one to 30 carbon atoms for a time and at a temperature to substantially completely intercalate said tantalum disulfide,
   wherein there are at least 10 atoms of sulfur per atom of tantalum and at least one mol of amine per atom of tantalum, said temperature is in the range of $-10°$ to $400°C$, and said time is from about one day to one year.

15. A method according to claim 14, wherein said amine is pyridine.

16. A method according to claim 14, wherein said amine is dimethylaniline.

17. An intercalated metal sulfide prepared according to claim 1.

18. An intercalated metal sulfide according to claim 17 wherein said metal sulfide is tantalum disulfide.

19. An intercalated metal sulfide according to claim 17 wherein said metal sulfide is tantalum disulfide, and said organic nitrogen compound is an amine.

20. A method for preparing a highly expanded crystalline tantalum disulfide which comprises:
   heating tantalum disulfide substantially completely intercalated with an organic nitrogen compound in the presence of an effective amount of sulfur; wherein said intercalated tantalum disulfide whose preparation ratios and conditions were at least one mol of organic nitrogen compound per atom of tantalum, and at a temperature of from $-10°$ to $400°C$, and for a time of about one day to one year; to at least a temperature of about $300°C$ at which deintercalation occurs, and
   maintaining at least said temperature until deintercalation is substantially complete.

21. A method according to claim 20, wherein said organic nitrogen compound is pyridine.

* * * * *